(12) United States Patent
Hoffstein et al.

(10) Patent No.: US 10,560,257 B2
(45) Date of Patent: Feb. 11, 2020

(54) HOMOMORPHIC ENCRYPTION

(71) Applicant: BROWN UNIVERSITY, Providence, RI (US)

(72) Inventors: Jeffrey Hoffstein, Providence, RI (US); Joseph H. Silverman, Needham, MA (US)

(73) Assignee: BROWN UNIVERSITY, Providence, RI (US)

( * ) Notice: Subject to any disclaimer, the term of this patent is extended or adjusted under 35 U.S.C. 154(b) by 200 days.

(21) Appl. No.: 15/742,837

(22) PCT Filed: Jul. 8, 2016

(86) PCT No.: PCT/US2016/041598
§ 371 (c)(1),
(2) Date: Jan. 8, 2018

(87) PCT Pub. No.: WO2017/008043
PCT Pub. Date: Jan. 12, 2017

(65) Prior Publication Data
US 2018/0212750 A1  Jul. 26, 2018

Related U.S. Application Data

(60) Provisional application No. 62/190,121, filed on Jul. 8, 2015.

(51) Int. Cl.
*H04L 9/00* (2006.01)
*H04L 9/06* (2006.01)
*G06F 17/16* (2006.01)

(52) U.S. Cl.
CPC .............. *H04L 9/008* (2013.01); *G06F 17/16* (2013.01); *H04L 9/0618* (2013.01); *H04L 2209/76* (2013.01)

(58) Field of Classification Search
CPC ... H04L 9/008; H04L 9/0618; H04L 2229/76; G06F 17/16
See application file for complete search history.

(56) References Cited

U.S. PATENT DOCUMENTS 6,959,085 B1 * 10/2005 Hoffstein ................ H04L 9/008
380/2
10,396,976 B2 * 8/2019 Kahrobaei
(Continued)

OTHER PUBLICATIONS

Henning Perl et al. "POSTER: An Implementation of the Fully Homomorphic Smart-Vercauteren Crypto-System" Proceedings of the 18th ACM conference on Computer and communications security, Oct. 2011 (pp. 837-839) (Year: 2011).*
(Continued)

*Primary Examiner* — Joseph P Hirl
*Assistant Examiner* — Thomas A Gyorfi
(74) *Attorney, Agent, or Firm* — Adler Pollock & Sheehan P.C.

(57) ABSTRACT

Systems, methods, and computer-readable storage devices storing instructions for homomorphic encryption via finite ring isomorphisms are provided. An example method includes selecting a polynomial f(x) of exact degree n with small coefficients in a ring $F_q[x]$ and selecting a polynomial h(y) of exact degree n in a ring $F_q[y]$. The method includes constructing an isomorphism from the ring $F_q[x]/(f(x))$ to the ring $F_q[y]/(h(y))$ and constructing an inverse isomorphism from the ring $F_q[y]/(h(y))$ to the ring $F_q[x]/(f(x))$. The method includes encrypting a message using said isomorphism from the ring $F_q[x]/(f(x))$ to the ring $F_q[y]/(h(y))$ and transmitting the encrypted message to a remote computer. The method also includes receiving one or more encrypted response messages from the remote computer based at least in part on the transmitted message and decrypting the one or more encrypted response messages.

20 Claims, 7 Drawing Sheets

(56) References Cited

U.S. PATENT DOCUMENTS

| | | | | |
|---|---|---|---|---|
| 2013/0339722 A1* | 12/2013 | Krendelev | ............ | H04L 9/008 |
| | | | | 713/150 |
| 2014/0185794 A1* | 7/2014 | Yasuda | ................ | H04L 9/008 |
| | | | | 380/28 |
| 2014/0185797 A1* | 7/2014 | Yasuda | ................ | H04L 9/008 |
| | | | | 380/44 |
| 2015/0270967 A1* | 9/2015 | Susella | .............. | H04L 9/3093 |
| | | | | 380/30 |
| 2015/0312028 A1* | 10/2015 | Cheon | .................. | H04L 9/008 |
| | | | | 713/189 |
| 2015/0381348 A1* | 12/2015 | Takenaka | ............. | H04L 9/008 |
| | | | | 380/30 |
| 2016/0112197 A1* | 4/2016 | Johnston | ............ | H04L 9/3093 |
| | | | | 713/168 |

OTHER PUBLICATIONS

Frederik Armknecht et al. "Group Homomorphic Encryption: Characterizations, Impossibility Results, and Applications" (25 pages) (Year: 2010).*

Brakerski Z., Vaikuntanathan V. (2011) Fully Homomorphic Encryption from Ring-LWE and Security for Key Dependent Messages. In: Rogaway P. (eds) Advances in Cryptology—CRYPTO 2011. CRYPTO 2011. Lecture Notes in Computer Science, vol. 6841. Springer, Berlin, Heidelberg (20 pages) (Year: 2011).*

Bos J.W., Lauter K., Loftus J., Naehrig M. (2013) Improved Security fora Ring-Based Fully Homomorphic Encryption Scheme. In: Stam M. (eds) Cryptography and Coding. IMACC 2013. Lecture Notes in Computer Science, vol. 8308. Springer, Berlin, Heidelberg (30 pages) (Year: 2013).*

* cited by examiner

US 10,560,257 B2

HOMOMORPHIC ENCRYPTION

PRIORITY

This application is a U.S. National Stage application of PCT International patent application No. PCT/US2016/041598, filed Jul. 8, 2016, which claims priority to U.S. Provisional Patent Application No. 62/190,121, filed Jul. 8, 2015, which applications are incorporated herein by reference. To the extent appropriate, a claim of priority is made to each of the above disclosed applications.

GOVERNMENT LICENSE RIGHTS

The invention was made with government support under DMS1349908 awarded by National Science Foundation (NSF). The government has certain rights in the invention.

BACKGROUND

Data encryption refers to the process of converting data into another format that cannot easily be understood by unauthorized parties. Computer systems often use data encryption to protect user's privacy, for example, when communicating over a network. Typically, when encrypted data is received, the data is decrypted so that the receiving party can understand and process the data. Thus, an underlying premise of many encryption technologies is that the receiving party must be trusted with the data.

It is with respect to these and other general considerations that embodiments have been made. Also, although relatively specific problems have been discussed, it should be understood that the embodiments should not be limited to solving the specific problems identified in the background.

SUMMARY

In general terms, this disclosure is directed to systems and methods for homomorphic encryption via finite ring isomorphisms. In one possible configuration and by non-limiting example one or more messages are encrypted using an isomorphism from one ring to another ring.

One aspect is a system for homomorphic encryption via finite ring isomorphisms, comprising: at least one processor; and memory, operatively connected to the at least one processor and storing instructions that, when executed by the at least one processor, cause the at least one processor to: select a polynomial $f(x)$ of exact degree n with small coefficients in a ring $Fq[x]$; select a polynomial $h(y)$ of exact degree n in a ring $Fq[y]$; construct an isomorphism from the ring $Fq[x]/(f(x))$ to the ring $Fq[y]/(h(y))$; construct an inverse isomorphism from the ring $Fq[y]/(h(y))$ to the ring $Fq[x]/(f(x))$; encrypt one or more messages using said isomorphism from the ring $Fq[x]/(f(x))$ to the ring $Fq[y]/(h(y))$; transmit the encrypted one or more messages to a remote computer; receive one or more encrypted response messages from the remote computer based at least in part on the transmitted one or more messages; and decrypt the one or more encrypted response messages.

Another aspect is a method for homomorphic encryption via finite ring isomorphisms, the method comprising: selecting a polynomial $f(x)$ of exact degree n with small coefficients in a ring $F_q[x]$; selecting a polynomial $h(y)$ of exact degree n in a ring $F_q[y]$; constructing an isomorphism from the ring $F_q[x]/(f(x))$ to the ring $F_q[y]/(h(y))$; constructing an inverse isomorphism from the ring $F_q[y]/(h(y))$ to the ring $F_q[x]/(f(x))$; encrypting one or more messages using said isomorphism from the ring $F_q[x]/(f(x))$ to the ring $F_q[y]/(h(y))$; transmitting the encrypted one or more messages to a remote computer; receiving one or more encrypted response messages from the remote computer based at least in part on the transmitted one or more messages; and decrypting the one or more encrypted response messages.

Yet another aspect is a computer-readable storage device having computer executable instructions stored thereon, which, when executed by a computing system, provide instructions to perform a method for homomorphic encryption via finite ring isomorphisms, the method comprising: selecting a polynomial $f(x)$ of exact degree n with small coefficients in a ring $F_q[x]$; selecting a polynomial $h(y)$ of exact degree n in a ring $F_q[y]$; constructing an isomorphism from the ring $F_q[x]/(f(x))$ to the ring $F_q[y]/(h(y))$; constructing an inverse isomorphism from the ring $F_q[y]/(h(y))$ to the ring $F_q[x]/(f(x))$; encrypting one or more messages using said isomorphism from the ring $F_q[x]/(f(x))$ to the ring $F_q[y]/(h(y))$; transmitting the encrypted one or more messages to a remote computer; receiving one or more encrypted response messages from the remote computer based at least in part on the transmitted one or more messages; and decrypting the one or more encrypted response messages.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive embodiments are described with reference to the following Figures.

The attached Appendix provides additional examples to aid in the understanding of the present technology.

DETAILED DESCRIPTION

Various embodiments are described more fully below with reference to the accompanying drawings, which form a part hereof, and which show specific example embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense. While different embodiments are illustrated, one of skill in the art will appreciate that different aspects from the different embodiments may be combined without departing from the scope of this disclosure.

Generally, data encryption refers to the process of encoding plaintext data (e.g., ordinary, readable text) into ciphertext (e.g., encrypted, non-readable data) to prevent unauthorized access to the data. Broadly, plaintext data is encrypted through the use of a private key and decrypted using an associated public key, thereby allowing only authorized users to access to the data.

Homomorphic encryption enables computation on encrypted data that is stored remotely, such as in the cloud. Homomorphic encryption is a type of data encryption that involves the encryption of plaintext data using a particular algebraic expression, wherein that particular algebraic operation is equivalent to another algebraic operation performed on the ciphertext data. Homomorphic encryption can be performed for both public key (asymmetric) and private key (symmetric) encryption.

Homomorphic encryption allows calculations to be performed on ciphertext. The present disclosure provides novel systems and methods of a leveled homomorphic encryption scheme that is based on a secret isomorphism between finite rings, wherein the secret isomorphism is defined as $\phi$: $R_1 \rightarrow R_2$. The disclosed encryption scheme provides both symmetric (private key) and asymmetric (public key) encryption.

Figure 1:
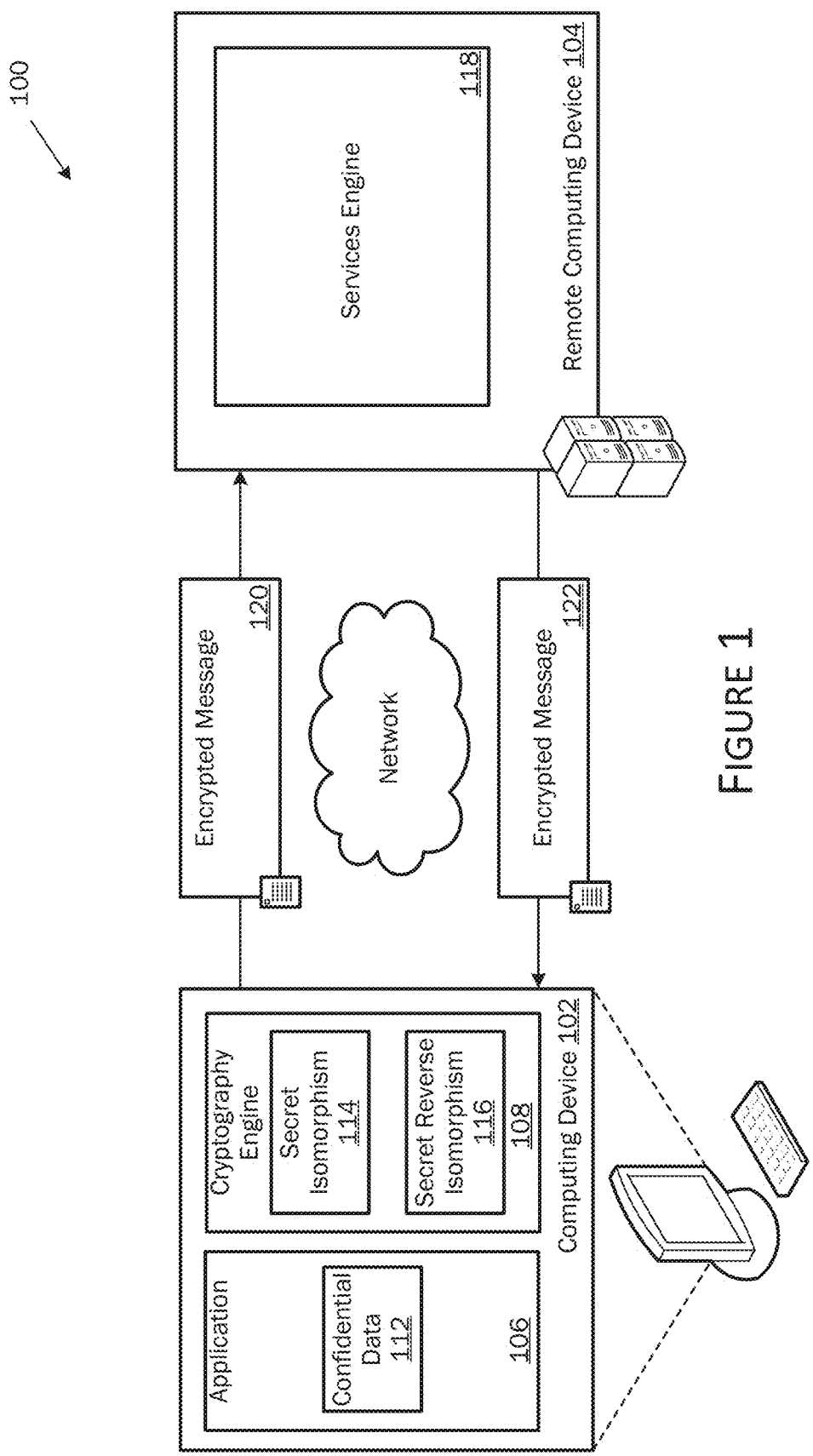
FIG. 1 is an example system for performing homomorphic encryption using finite ring isomorphisms.

FIG. 1 is an example system 100 for performing homomorphic encryption using finite ring isomorphisms. The system 100 includes a computing device 102 and a remote computing device 104. The computing device 102 encrypts data using a secret isomorphism 114 to generate an encrypted message, which the computing device 102 sends to the remote computing device 104. The remote computing device 104 receives the encrypted message, performs calculations on or using the encrypted message 120 without ever decrypting the encrypted message, and sends the results back to the computing device 102 in another encrypted message. In this manner, the computing device 102 can use the processing capabilities of the remote computing device 104 without revealing the data upon which the calculations are performed in a format that is understandable by the remote computing device.

The computing device 102 and the remote computing device 104 communicate over a network. The network may be any type of network that is capable of facilitating communications between the computing device and the remote computing device. Examples of such networks include, but are not limited to, LANs, WANs, cellular networks, and/or the Internet.

The computing device 102 includes a processor and memory, and may be any type of computing device. Non-limiting examples of the computing device include but are not limited to server computers, network appliances, network storage devices, desktop computers, laptop computers, tablets, smart phones, wearable devices, or other type of computing devices. In this example, the computing device 102 includes an application 106 and a cryptography engine 108.

The application 106 is a computer program that performs one or more functions. The application may run autonomously or may be controlled by a user. In some embodiments, the application 106 is interactive and receives one or more inputs from a user. The application 106 may interact with or generate confidential data 112. The confidential data 112 may be any type of data that a user desires to keep private. Examples of the confidential data 112 include but are not limited to health data, genetic data, security data, and financial data.

In some embodiments, the system 100 operates to maintain the confidentiality of the confidential data 112 by only transmitting the confidential data 112 from the computing device 102 when it has been encrypted to ciphertext by the cryptography engine. Further, the computing device 102 may be the only device that is able to decrypt the ciphertext.

The cryptography engine 108 operates to encrypt unencrypted data such as the confidential data 112 and decrypt encrypted data such as the encrypted message 122 received from the remote computing device 104. In some embodiments, the cryptography engine 108 operates to generate a secret isomorphism 114 that is usable to encrypt data and a secret inverse isomorphism 116 that is usable to decrypt data encrypted using the secret isomorphism 114. The secret isomorphism 114 may be from a private-basis ring to a public-basis ring. The secret inverse isomorphism 116 may be from the public-basis ring to the private-basis ring. In some embodiments, the secret isomorphism 114 and the secret inverse isomorphism 116 are stored on the computing device 102 and are not shared with or made available to any other computing devices.

The computing device 102 includes a processor and memory, and may be any type of computing device. Non-limiting examples of the computing device include but are not limited to server computers, network appliances, network storage devices, desktop computers, laptop computers, tablets, smart phones, wearable devices, or other type of computing devices. In this example, the remote computing device 104 includes a services engine 118.

The services engine 118 performs computing services. For example, the services engine 118 may perform computing services for the computing device 102 based on the encrypted message 120 received from the computing device 102. The services engine 118 performs the services without decrypting the encrypted message 120. In one example, the services engine 118 may perform calculations on the encrypted message 120 that are usable in performing genetic analysis.

In some embodiments, the cryptography engine 108 performs leveled homomorphic encryption, which imposes a limit on the number of computations that can be performed on the ciphertext before numerical error overcomes the data in the ciphertext. In some embodiments, the services engine 118 may therefore limit the number of computations it performs based on the limit imposed by the cryptography engine 108.

Figure 2:
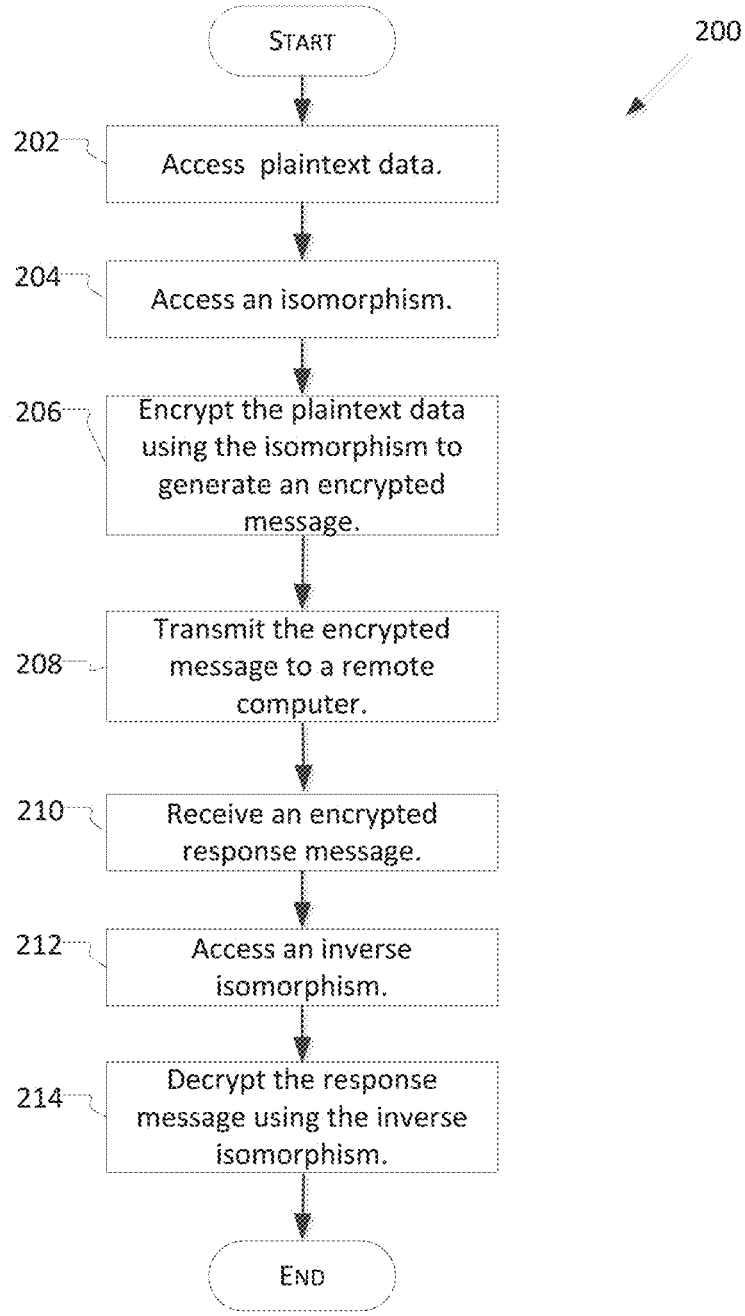
FIG. 2 is an example method for performing calculations on data using homomorphic encryption with the system of FIG. 1.

FIG. 2 is an example method 200 for performing calculations on data using homomorphic encryption. The method 200 may be employed to use the processing capacity of an external computing device such as a server to perform calculations on confidential data without allowing the external computing device to decrypt the confidential data. As an example, the method 200 may be executed by a component of an example system such as the system 100. In examples, the method 200 may be executed on one or more devices comprising at least one processor configured to store and execute operations, programs, or instructions.

At operation 202, plaintext data is accessed. The plaintext data may comprise confidential data, non-confidential data, or a combination of both. The plaintext data may be accessed from a storage device such as a hard drive or memory device on a computing device. The plaintext data may be stored in one or more tables in a database or files stored in a file system. As another example, the plaintext data may be generated by an application running on the computing device. The plaintext data may include various data received as user input from a user of the computing device as well. As used herein, plaintext data refers to data that is unencrypted. Plaintext data may be any type of data, including but not limited to textual data, audio data, image data, video data, computer instruction data, and any other types of data.

At operation 204, an isomorphism is accessed. The isomorphism maps from a private-basis ring to a public-basis ring. The isomorphism is usable to transform data represented in the private-basis ring to the public-basis ring. In some embodiments, the isomorphism is accessed from a storage location on the computing device or another secure location. Alternatively, the isomorphism is generated at the time the method 200 is performed according to the methods described herein.

At operation 206, the plaintext data is encrypted using the isomorphism to generate an encrypted message. For example, the plaintext data may be encoded as polynomials in the private-basis ring, which are then converted to public-basis ring using the isomorphism.

At operation 208, the encrypted message is transmitted to a remote computing device. For example, the encrypted message may be transmitted over one or more wired or wireless networks.

Although the remote computer will receive the encrypted message, the remote computer will be unable to decrypt the encrypted message so the remote computer will not be able to understand the encrypted message. Similarly, any third-parties that intercept the encrypted message will also be unable to decrypt or understand the message.

Even though the remote computer is unable decrypt and therefore have access to the plaintext message, the remote computer may perform various computations on the encrypted message to generate one or more encrypted response messages. In some embodiments, the computations performed by the remote computer are limited to a particular level associated with the homomorphic encryption scheme. The level specifies an amount of calculations that can be performed before numerical error overwhelms the results of the calculations.

Because the remote computer performs computations on the encrypted message, there is no need to exchange decryption keys with the remote computer. Accordingly, a third party cannot intercept the decryption keys and later use the intercepted decryption keys to decrypt encrypted messages. Instead, the decryption keys (e.g., the secret inverse isomorphism) are kept confidential to the computing device.

At operation 210, one or more encrypted response messages are received by the computing device. The encrypted response messages may be the result of the remote computer performing various calculations on the encrypted message.

At operation 212, an inverse isomorphism is accessed. The inverse isomorphism inverses the isomorphism. In other words, the inverse isomorphism is from the public-basis ring to the private-basis ring. Like the isomorphism accessed in operation 204, the inverse isomorphism may be accessed from a storage device on the computing device or may be generated according to the methods described herein.

At operation 214, the encrypted response message is decrypted using the inverse isomorphism. For example, the encrypted response message may be converted from polynomials in the public-basis ring to polynomials in the private-basis ring using the inverse isomorphism. The polynomials in the private-basis ring may then be converted to plaintext data.

Once the response message is decrypted to plaintext data, the plaintext data can be stored or presented to a user. Alternatively, the plaintext data can be used for further processing by the application.

The leveled homomorphic encryption scheme may be based on a secret isomorphism of rings. The isomorphism may be represented as: $\phi: F_{q^n} \to F_{q^n}$.

In some embodiments, two bases for $F_{q^n}$ are chosen as an $F_q$-vector space. Specifically, a private $F_q$-basis $$v_1, \ldots, v_n \in F_{q^n}$$

and a public $F_q$-basis $$w_1, \ldots, w_n \in F_{q^n}$$

are chosen. To encrypt a plain text message, such as $m = \Sigma \epsilon_i v_i$ with $\epsilon_i$ mod p, a random polynomial is chosen, such as $r = \Sigma \delta_i v_i$ with small $\delta_i$.

Then, the ciphertext is generated as $c = pr + m$ expressed in terms of the public $F_q$-basis (w). To decrypt a ciphertext, the ciphertext is expressed in terms of the private $F_q$-basis (v), then the v-coordinates are lifted from $F_q$ to $\mathbb{Z}$, and reduced by mod p. In some embodiments, p is a small prime number that is private (e.g., known only to the computing device performing encryption). The above-described cryptosystem is similar to a classical Hill cipher using a secret n-by-n matrix to define a linear transformation $F_{q^n} \to F_{q^n}$. However, additional conditions are imposed on the cryptosystem as described herein.

$F_q$ has a multiplication and multiplication of basis elements in the ring $F_{q^n}$ gives the formulas $$v_i v_j = \sum_{k=1}^{n} \alpha_{ijk} v_k \text{ and } w_i w_j = \sum_{k=1}^{n} \beta_{ijk} w_k$$

for certain elements $\alpha_{ijk}, \beta_{ijk} \in F_q$. Accordingly, the following conditions can be imposed:

1. $\beta_{ijk}$ is public, which allows the public to perform ring operations (e.g., addition and multiplication) using the public $F_q$-basis (w);
2. $\alpha_{ijk}$ is secret and small, which allows for correct decryption; and
3. multiplication in $F_{q^n}$ and $F_{p^n}$ are "compatible" when expressed in terms of "small" linear combinations of appropriately chosen bases, as is explained in greater detail herein.

The $n^3$-tuples $(\alpha_{ijk})$ and $(\beta_{ijk})$ may be symmetric 3-tensors. In particular, the small secret $\alpha_{ijk}$ satisfies compatibility relations coming from the commutative and associative laws $$v_i v_j = v_j v_i \text{ and } (v_i v_j) v_i = v_i (v_j v_i).$$

In some embodiments, the private $F_q$-basis and public $F_q$-basis are constructed as described herein. To avoid confusion, the notation $F_q[x]/(f(x))$ and $F_q[y]/(h(y))$ for certain irreducible polynomials $f(x)$ and $h(y)$ of degree n such that $f(x)$ has small coefficients are used to refer to two copies of the ring $F_q$. The secret basis is $1, x, \ldots, x^{n-1}$ with secret multiplication rules determined by $f(x)$, and the public basis is $1, y, \ldots, y^{n-1}$ with public multiplication rules determined by $h(y)$. The formulas that express powers of x and y in terms of each other are also secret. Table 1 below provides some notation that is used herein.

TABLE 1

| public  | q    | prime (or prime power) |
| --- | --- | --- |
| public  | n    | dimension (degree) parameter |
| private | f(x) | irreducible monic polynomial of degree n in $F_q[x]$ with small coefficients |
| private | φ(y) | polynomial of degree less than n in $F_q[y]$ |
| private | h(y) | irreducible monic polynomial of degree n in $F_q[y]$ with arbitrary coefficients |

In some embodiments, n is chosen as a prime so that there are no intermediate fields between $F_q$ and $F_{q^n}$. Additionally, in some embodiments, f(x) is chosen so that it is irreducible in $F_p[x]$ as well as $F_q[x]$.

A method for finding polynomials f(x) and h(y) and an explicit isomorphism, $$\frac{F_q[x]}{(f(x))} \xrightarrow{\sim} \frac{F_q[y]}{(h(y))},$$

is described below. Polynomials f, φ, and h are selected to satisfy $h(y)|f(\phi(y))$.

Methods for finding such a triple of polynomials are discussed herein. Since f and h are irreducible over $F_q$, both of the quotients $F_q[x]/(f(x))$ and $F_q[y]/(h(y))$ are rings with $q^n$ elements. Further, the polynomial φ defines an isomorphism of rings via $$\frac{F_q[x]}{(f(x))} \rightarrow \frac{F_q[y]}{(h(y))}$$

$m(x) \bmod f(x) \mapsto m(\phi(y)) \bmod h(y)$.

The polynomial ψ defines an inverse isomorphism to the isomorphism defined by the polynomial φ. Specifically, the polynomial ψ is selected as a polynomial of degree less than n satisfying $\phi(\psi(x)) \equiv x (\bmod f(x))$.

Then ψ gives an inverse to the isomorphism defined by polynomial φ, that is, the map $$\frac{F_q[y]}{(h(y))} \rightarrow \frac{F_q[x]}{(f(x))}$$

$c(y) \bmod h(y) \mapsto c(\psi(x)) \bmod f(x)$ has the property that $\phi(\psi(x)) \equiv x (\bmod f(x))$ and $\psi(\phi(y)) \equiv y (\bmod h(y))$.

A method is described herein to find ψ from φ and f via linear algebra.

Figure 3:
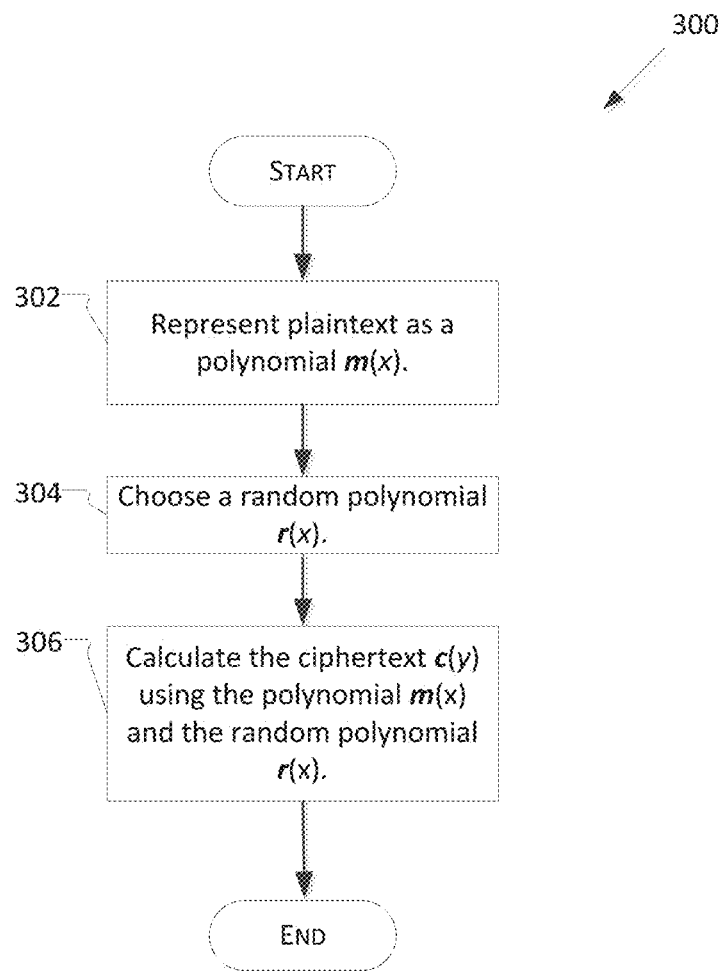
FIG. 3 is an example method for encrypting data using the system of FIG. 1.

FIG. 3 is an example method 300 for encrypting data. The method 300 may be employed to perform homomorphic encryption of plaintext data. As an example, the method 300 may be executed by a component of an example system such as the system 100. In examples, the method 300 may be executed on one or more devices comprising at least one processor configured to store and execute operations, programs, or instructions.

At operation 302, the plaintext is represented a polynomial $m(x) \in \mapsto [x]$ of degree less than n with small coefficients.

At operation 304, a random polynomial $r(x) \in F_q[x]$ of degree less than n with small coefficients is chosen.

At operation 306, a ciphertext c(y) is computed. For example, the ciphertext may be computed as $c(y) = pr(\phi(y)) + m(\phi(y)) \bmod h(y) \in Fq[y]/h(y)$.

Figure 4:
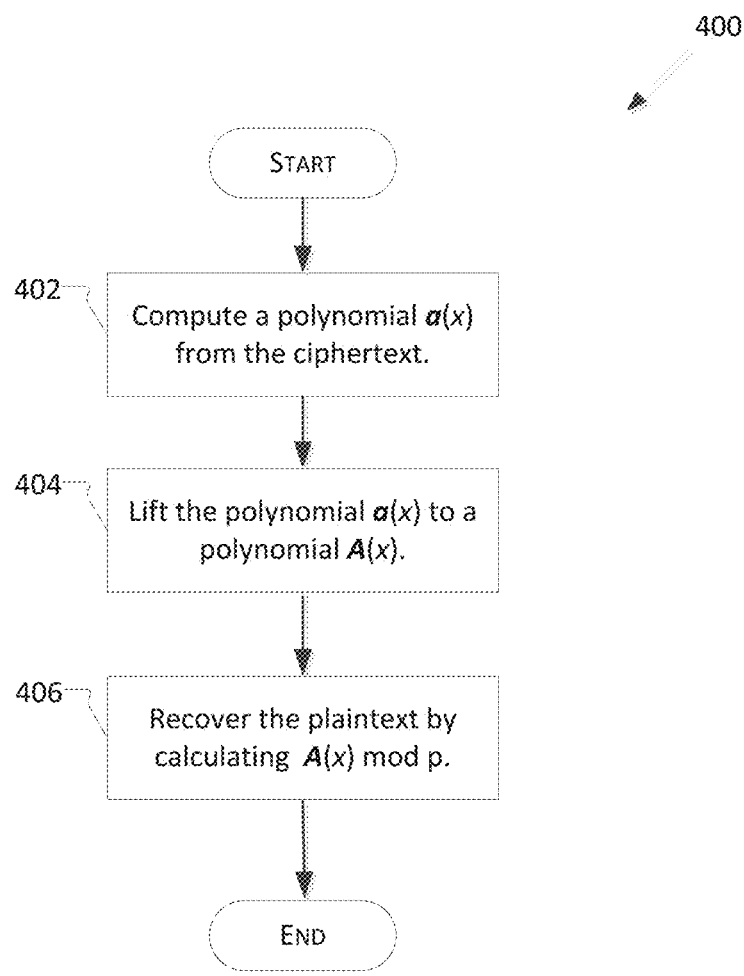
FIG. 4 is an example method for encrypting data using the system of FIG. 1.

FIG. 4 is an example method 400 for decrypting data. The method 400 may be employed to perform homomorphic decryption of plaintext data. As an example, the method 400 may be executed by a component of an example system such as the system 100. In examples, the method 400 may be executed on one or more devices comprising at least one processor configured to store and execute operations, programs, or instructions.

Decryption is performed on a ciphertext such as c(y), which may be generated according to the method illustrated and described with respect to FIG. 4 or by performing calculations on a ciphertext generated accordingly.

At operation 402, a polynomial a(x) is computed from the ciphertext. The polynomial a(x) may be computed based on the inverse isomorphism. For example a(x) may be computed as $a(x) = c(\psi(x)) \bmod f(x) \in Fq[x]/f(x)$.

At operation 404, the polynomial a(x) is lifted to a polynomial A(x). The polynomial A(x) may be in $\mathbb{Z}[x]$ with degree less than n and having the smallest possible coefficients.

At operation 406, the plaintext is recovered by calculating $A(x) \bmod p = \in (\mathbb{Z}/p\mathbb{Z})[x]$.

This method 400 works because:

$$a(x) \equiv c(\psi(x)) \bmod f(x)$$
$$\equiv pr(\phi(\psi(x))) + m(\phi(\psi(x))) (\bmod f(x))$$
$$\equiv pr(x) + m(x) (\bmod f(x)).$$

Then since r and m have small coefficients, A(x) is exactly equal to pr(x)+m(x), so A(x) mod p is equal to m(x) mod p.

Figure 5:
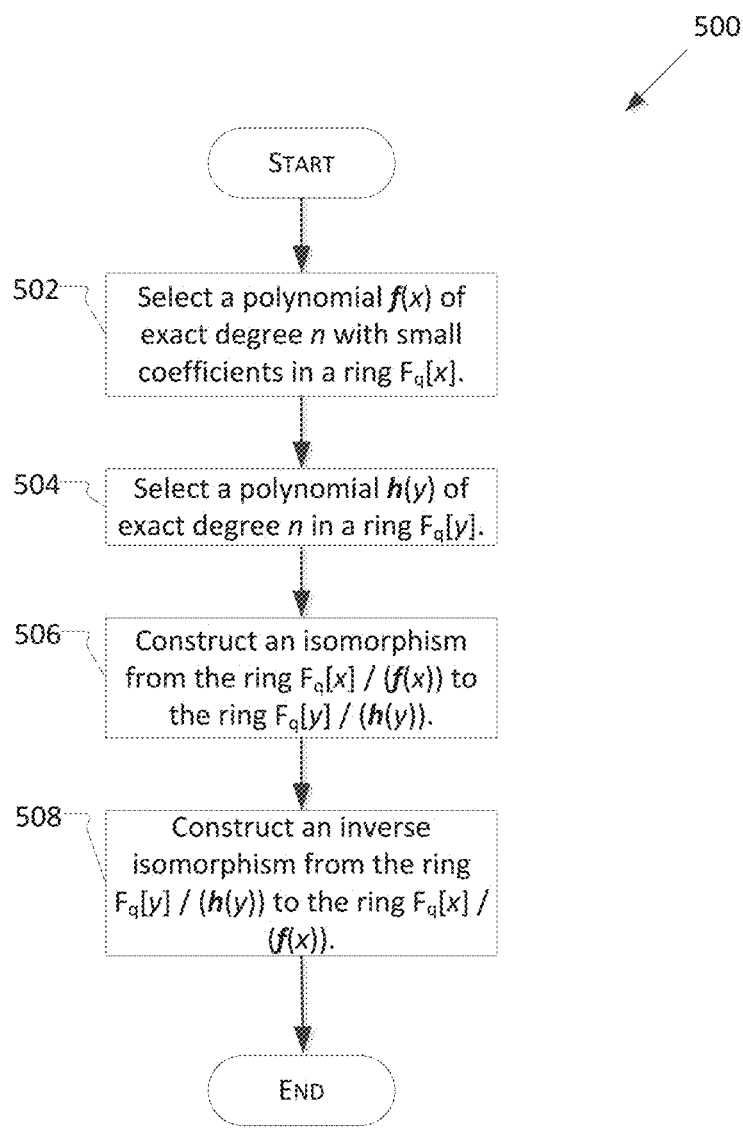
FIG. 5 is an example method for generating an isomorphism and an inverse isomorphism using the system of FIG. 1.

FIG. 5 is an example method 500 for generating an isomorphism and an inverse isomorphism. The method 500 may be employed to perform homomorphic encryption. As an example, the method 500 may be executed by a component of an example system such as the system 100. In examples, the method 500 may be executed on one or more devices comprising at least one processor configured to store and execute operations, programs, or instructions.

At operation 502, a polynomial f(x) of exact degree n with small coefficients in a ring $F_q[x]$ is selected. In some embodiments, the selected polynomial f(x) is irreducible and monic. For example, the polynomial f(x) may be selected randomly.

At operation 504, a polynomial h(y) of exact degree n with small coefficients in a ring $F_q[y]$ is selected. In some embodiments, the selected polynomial h(y) is irreducible and monic. Like the polynomial f(x), the polynomial h(y) may be selected randomly.

At operation 506, an isomorphism from the ring $F_q[x]/(f(x))$ to the ring $F_q[y]/(h(y))$ is constructed. In some embodiments, the isomorphism is constructed by determining a root φ(y) of the polynomial f(x) in the ring $F_q[y]/(h(y))$. The root φ(y) of the polynomial f(x) in the ring $F_q[y]/(h(y))$ may be found using a root-finding algorithm.

At operation 508, an inverse isomorphism from the ring $F_q[y]/(h(y))$ to the ring $F_q[x]/(f(x))$ is constructed. In some embodiments, the inverse isomorphism is constructed by determining an inverse root $\psi(x)$ of the polynomial $h(y)$ in the ring $F_q[x]/(h(x))$. The inverse isomorphism may be constructed from the isomorphism using linear algebra.

The described encryption engine has leveled homomorphic properties. For example, if $m_1(x), \ldots, m_K(x)$ are plaintexts and $c_1(y), \ldots, c_K(y)$ are associated ciphertexts and q is chosen sufficiently large, then decryption of the product $c_1(y), \ldots, c_K(y)$ gives the exact value of $$\prod_{i=1}^{K} (pr_i(x) + m_i(x)) \text{ in } \frac{\mathbb{Z}[x]}{f(x)}.$$

Then, reduction modulo p yields $$m_1(x) \ldots m_K(x) \text{ in } F_p[x]/(f(x)).$$

Addition of ciphertexts works similarly. But note that computation of plaintexts takes place in the ring $F_p[x]/f(x)$.

A method to construct the polynomials $f, h, \phi$, and $\psi$ is described below with respect to FIG. 6. The four polynomials $f, h, \phi,$ and $\psi$ must satisfy the following conditions:
$f(x) \in F_q[x]$ is of exact degree n with small coefficients;
$h(y) \in F_q[y]$ is of exact degree n with random coefficients;
$\phi(y) \in F_q[y]$ and $\psi(y) \in F_q[y]$ have degree less than n;
$h(y) | f(\phi(y))$; and
$\phi(\psi(x)) \equiv x \pmod{f(x)}$.

In some embodiment, one or both of $f(x)$ and $h(y)$ are irreducible monic polynomials.

Figure 6:
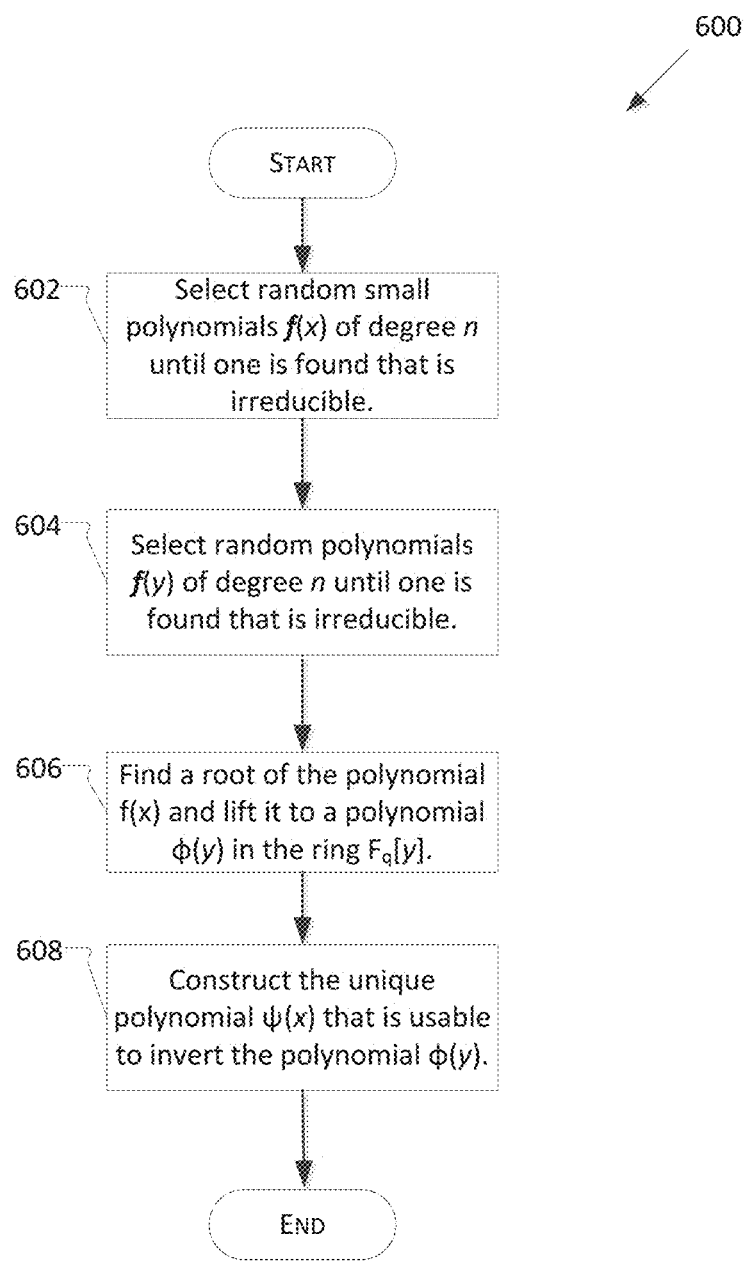
FIG. 6 is an example method for key generation using the system of FIG. 1.

FIG. 6 is an example method 600 for key generation. The method 600 may be employed to perform homomorphic encryption. As an example, the method 600 may be executed by a component of an example system such as the system 100. In examples, the method 600 may be executed on one or more devices comprising at least one processor configured to store and execute operations, programs, or instructions.

At operation 602, random small degree n polynomials $f(x) \in F_q[x]$ are selected until one is found that is irreducible. The polynomials $f(x) \in F_q[x]$ may be of exact degree n. Additionally, in some embodiments, the selected polynomials $f(x) \in F_q[x]$ are monic.

There are $q^n$ monic degree n polynomials in $F_q[x]$, and the proportion of these polynomials that are irreducible is $$\frac{1}{n} \sum_{d | n} \mu\left(\frac{n}{d}\right) \frac{1}{q^{n-d}}.$$

This is more-or-less $1/n + O(1/q^{n/2})$ and is the function field version of the classical prime number theorem. Classical primality tests for integers such as Miller-Rabin can be adapted to the function field setting and used to check (at least with very high probability) whether a given polynomial is irreducible. The probability of a given polynomial being irreducible is roughly $1/n$.

At operation 604, random degree n polynomials $h(y) \in F_q[y]$ are selected until one is found that is irreducible. The polynomials $h(y) \in F_q[y]$ may be of exact degree n. Additionally, in some embodiments, the selected polynomials $h(y) \in F_q[y]$ are monic. Testing whether $h(y)$ is irreducible can be performed similarly to testing whether $f(x)$ is irreducible as described with respect to operation 602.

At operation 606, a root of the polynomial $f(x)$ in the field $F_q[y]/(h(y)) \cong F_{q^n}$ is found. This root is then lifted to a polynomial $\phi(y) \in F_q[y]$ of degree less than n. A polynomial time root-finding algorithm such as the routine polrootsff in Pari-GP available from the PARI group, Bordeaux, France can be used. Other root-finding algorithms may be used as well. Because the polynomial $f(x)$ is irreducible of degree n, any one of its roots generates the field $F_{q^n}$. Since any two fields with $q^n$ elements are isomorphic, $f(x)$ must have a root in the ring $F_q[y]/(h(y))$. Further, since $F_{q^n}/F_q$ is Galois, any irreducible polynomial with one root must split completely, so $f(x)$ has n distinct roots in the ring $F_q[y]/(h(y))$. Some embodiments take $\phi(y) \bmod h(x)$ as any one of these roots.

At operation 608, a unique polynomial $\psi(x) \in F_q[x]$ of degree less than n is constructed that satisfies $\psi(\phi(x)) \equiv y \pmod{h(y)}$. In some embodiments, the polynomial $\psi(x)$ is found by finding the roots of $h(y)$ in the ring $F_q[y]/(h(y))$ in a manner similar to that described in operation 606. Then, the root that satisfies $\psi(\phi(x)) \equiv y \pmod{h(y)}$ is selected. Alternatively, in some embodiments, a root of $\phi(y) - x$ is calculated in the ring $F_q[x]/(f(x))$.

As another alternative, linear algebra can be used to find the unique polynomial $\psi(x)$. Because the map defined by $x \mapsto \phi(y)$ is a field isomorphism, there is an inverse isomorphism determined by the image of y. Accordingly, the inverse isomorphism can be written as $$y \mapsto \psi(x) = \sum_{i=0}^{n-1} c_i x^i.$$

The polynomial $\psi(x)$ is then found by determining the $c_i$ coefficients. Since $$y \mapsto \psi(x) \mapsto \psi(\phi(y))$$

gives an automorphism of the ring $F_q[y]/h(y)$, $$\psi(\phi(y)) \equiv y \pmod{h(y)}.$$

Hence, it suffices to determine the (unique) polynomial $\psi(x)$ of degree less than n satisfying the above equation, which when combined with the automorphism can be written as $$\sum_{i=0}^{n-1} c_i \phi(y)^i \equiv y \pmod{h(y)}.$$

Each power $\phi(y)^i$ is written modulo $h(y)$ as polynomial of degree less than n. In other words, the known values of $\phi(y)$ and $h(y)$ are used to write $$\phi(y)^i = \sum_{j=0}^{n-1} a_{ij} y^j \pmod{h(y)} \text{ for } 0 \le i \le n.$$

Substituting this into $\psi(\phi(y))$ yields $$\psi(\phi(y)) = \sum_{i=0}^{n-1} c_i \phi(y)^i$$

$$\equiv \sum_{i=0}^{n-1} c_i \sum_{j=0}^{n-1} a_{ij} y^j \pmod{h(y)}$$

-continued $$\equiv \sum_{i=0}^{n-1} c_i \left( \sum_{j=0}^{n-1} a_{ij} y^j \right) (\text{mod } h(y)).$$

Hence $\psi$ will satisfy $\psi(\phi(y)) \equiv y \pmod{h(y)}$ if $c_0, \ldots, c_{n-1}$ are chosen to satisfy $$\sum_{j=0}^{n-1} a_{ij} c_i = \begin{cases} 1 \text{ if } j = 1, \\ 0 \text{ if } j \neq 1. \end{cases}$$

This is a system of n equations for the n variables $c_0, \ldots, c_{n-1}$ over the ring $F_q$ and can be solved using standard techniques to find the polynomial $\psi(y)$ that will satisfy $\psi(\phi(y)) \equiv y \pmod{h(y)}$.

In some embodiments, using linear algebra to find the unique polynomial $\psi(x)$ includes computing one or more powers of $\phi(y)^i \pmod{h(y)}$ for values of i between 0 and n in the field $F_q[x]$, wherein each of the one or more powers includes a coefficient value; placing each coefficient value into a coefficient matrix; computing an inverse matrix using the coefficient matrix; and computing the coefficients for an inverse polynomial, wherein the coefficients are based on the inverse matrix.

In some embodiments, the polynomial f(x) is secret and the polynomial h(y) is public. Because the polynomials f(x) and h(y) are chosen independently, knowledge of the polynomial h(y) reveals no information about f(x). A hypothetical attacker would only begin to acquire information about f(x) when given a ciphertext. Further, the fact that there are no security issues in the of h(y) other than that it be irreducible in $F_q[y]$ allows for choosing h(y) to simplify field operation in the ring $F_q[y]/(h(y))$. For example, h(y) may be a trinomial.

The encryption system described herein may be used for either symmetric (private key) leveled homomorphic cryptosystems or asymmetric (public key) cryptosystems. Initially, a list of encryptions is published. For example, $e_{0,1}, e_{0,2}, \ldots, e_{0,l}$ are encryptions of 1, $e_{1,1}, e_{1,2}, \ldots, e_{1,l}$ are encryptions of x, $\ldots$ $e_{n-1,1}, e_{n-1,2}, \ldots, e_{n-1,l}$ are encryptions of $x^{n-1}$.

Then a mod p plaintext m(x) is encrypted as $$c = \sum_{j=1}^{t} \sum_{i=0}^{n-1} (pr_{ij} + m_{ij}) e_{ij} (\text{mod } q),$$

where the $r_{ij}$ are random trinary values and where for each i, a j(i) in [1,l] is randomly chosen and $m_{ij}$ is set as $$m_{ij} = \begin{cases} m_i & \text{if } j = j(i), \\ 0 & \text{if } j \neq j(i). \end{cases}$$

Then c is an encryption of m. For a given choice of $\{r_{ij}\}$ and m, there are $l^n$ possible encryptions depending on the choice of j(i). So assuming that there is a collision attack, the quantity $l^{n/2}$ should be chosen larger than $2^K$ for the desired bit security K. The public key has size roughly $nl*\log_2(q)$ bits. In some embodiments, the public key size is further reduced by publishing only the l encryptions of x since one can multiply i of those chosen at random with replacement to get $l^i$ encryptions of $x^i$.

In alternate embodiment, the parameter p is a polynomial instead of a small prime number, as explained herein. A product of t plaintexts has the form $$\prod_{i=1}^{t} (pr_i(x) + m_i(x)) \text{mod } f(x).$$

In order for decryption to be successful, the coefficients of this reduced product must be in the range $-\frac{1}{2}q$ to $\frac{1}{2}q$. In some situations to reduce the size of the coefficients of the above-described product of t plaintexts (prior to the reduction modulo f(x)), a polynomial p(x) is used for the parameter p. There are some potential tradeoffs to this approach, however. First, if p(x) is non-constant, then the degree of r(x) is smaller, which means there is less combinatorial security in the choice of r. Second, decryption ultimately reveals the value of m(x) in the ring $\mathbb{Z}[x]/(p(x), f(x))$. So, for example, if $p(x)=x-2$, then one obtains the value of m(2) mod f(2), and thus all computations are being done in the ring $\mathbb{Z}/f(2)\mathbb{Z}$. In this example, some embodiments chose an f(x) so that f(2) is prime. More generally, some embodiments choose an f(x) so that the ring $\mathbb{Z}[x]/(p(x), f(x))$ is a field. In some embodiments, decrypting the ciphertext will be based in part on an image of the encrypted message in the ring $F_q[x]/(f(x), p(x))$, the quotient of the polynomial ring $F_q[x]$ by the ideal generated by the polynomials f(x) and p(x).

Having described various example methods to perform homomorphic encryption, the disclosure will now describe systems that may be employed to perform the methods disclosed herein. FIG. 6 and the additional discussion in the present disclosure are intended to provide a brief general description of a suitable computing environment in which the disclosed embodiments and/or portions thereof may be implemented. Although not required, the embodiments described herein may be implemented as computer-executable instructions, such as by program modules, being executed by a computer, such as a client workstation or a server, including a server operating in a cloud environment. Generally, program modules include routines, programs, objects, components, data structures and the like that perform particular tasks or implement particular abstract data types. Moreover, it should be appreciated that the disclosed embodiments and/or portions thereof may be practiced with other computer system configurations, including hand-held devices, multi-processor systems, microprocessor-based or programmable consumer electronics, network PCs, mini-computers, mainframe computers and the like. The disclosed embodiments may also be practiced in distributed computing environments where tasks are performed by remote processing devices that are linked through a communications network. In a distributed computing environment, program modules may be located in both local and remote memory storage devices.

Figure 7:
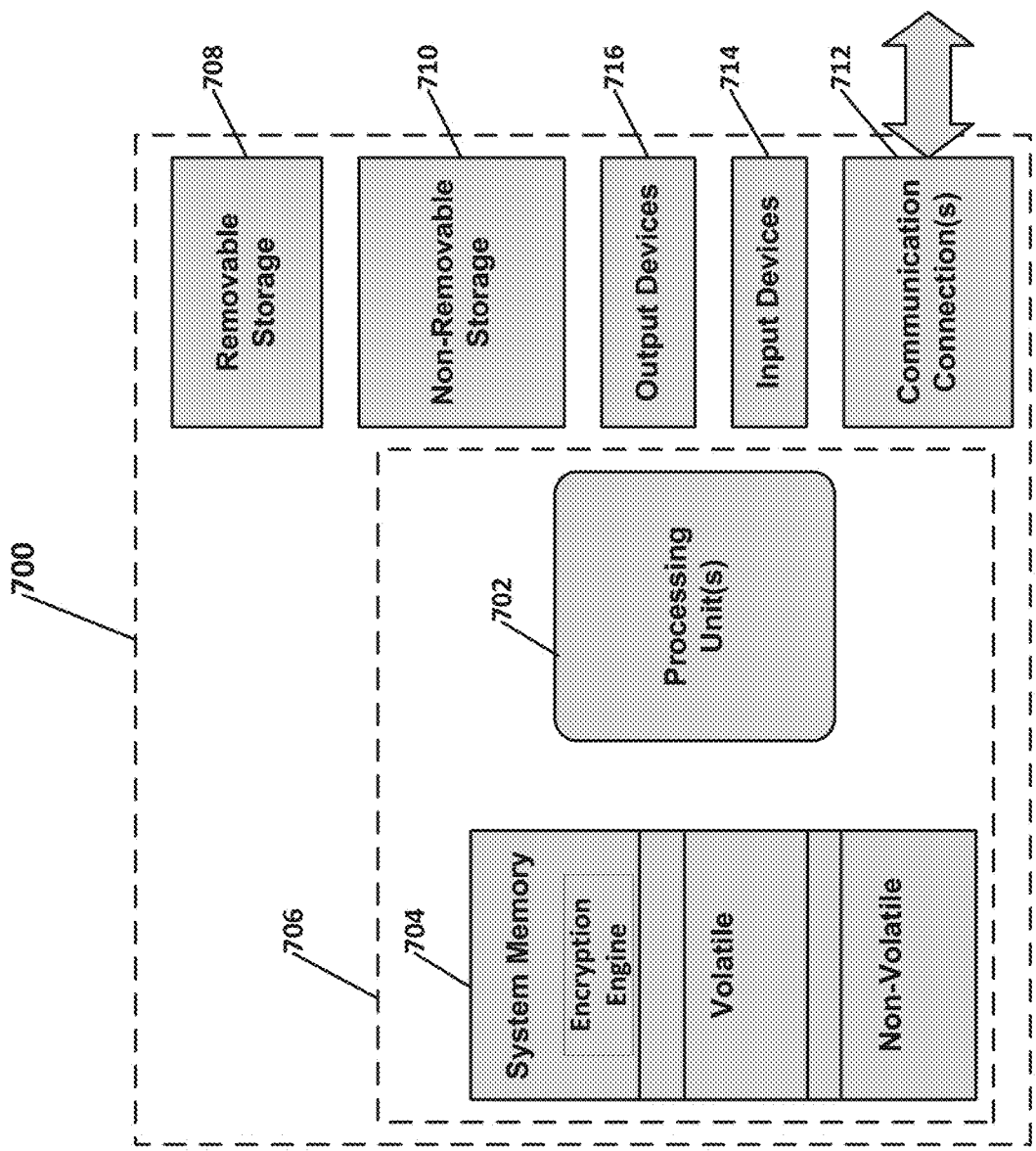
FIG. 7 illustrates one example of a suitable operating environment in which one or more of the aspects of the disclosure may be implemented.

FIG. 7 illustrates one example of a suitable operating environment 700 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smartphones, network PCs, minicomputers, mainframe computers, distributed computing environments that include any of the above systems or devices, and the like.

In its most basic configuration, operating environment 700 typically includes at least one processing unit(s) 702 and memory 704. Depending on the exact configuration and type of computing device, memory 704 (instructions to perform homomorphic encryption) may be volatile (such as RAM), non-volatile (such as ROM, flash memory, etc.), or some combination of the two. Memory 704 may store computer instructions related to performing the homomorphic encryption and decryption embodiments disclosed herein, may store raw data, and/or may store compressed and encrypted data. Memory 704 may also store computer-executable instructions that may be executed by the processing unit(s) 702 to perform the methods disclosed herein.

This most basic configuration is illustrated in FIG. 6 by dashed line 706. Further, environment 700 may also include storage devices (removable, 708, and/or non-removable, 710) including, but not limited to, magnetic or optical disks or tape. Similarly, environment 700 may also have input device(s) 714 such as keyboard, mouse, pen, voice input, etc. and/or output device(s) 716 such as a display, speakers, printer, etc. Also included in the environment may be one or more communication connections, 712, such as an Ethernet adaptor, a modem, a Bluetooth adaptor, WiFi adaptor, etc.

Operating environment 700 typically includes at least some form of computer readable media. Computer readable media can be any available media that can be accessed by processing unit(s) 702 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 700 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The aspects of the disclosure described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices can be employed to perform the functionality disclosed herein without departing from the scope of the disclosure.

This disclosure described some embodiments of the present technology with reference to the accompanying drawings, in which only some of the possible embodiments were shown. Other aspects can, however, be embodied in many different forms and should not be construed as limited to the embodiments set forth herein. Rather, these embodiments were provided so that this disclosure was thorough and complete and fully conveyed the scope of the possible embodiments to those skilled in the art.

Although specific embodiments were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

APPENDIX

A Numerical Example: A Single Encryption

In this section we do an example illustrating key creation, encryption, and decryption with very small parameters that do not allow homomorphic decryption. We take $q=11, n=7, p=3.$ We choose random small monic polynomials of degree n in $\mathbb{F}_q[x]$ until finding one that is irreducible,[3]

[3]This f(x) is reducible modulo 3, but serves to illustrate the FF-Encrypt algorithm.

$f(x)=x^7-x^6-x^4+x^3+1.$

We next choose random small polynomials of degree n in $\mathbb{F}_q[x]$ (but no longer with small coefficients) until finding one that is irreducible:

$h(y)=y^7+y^6-y^5+5y^4+5y^3-4y^2+3y-3.$

We use a root-finding algorithm to find a root φ(y) of f(x) in the field $\mathbb{F}_q[y]/(h(y))$:

$\phi(y)=-y^6+4y^5+2y^4-3y^3+y^2-4y+5.$

We use the linear algebra method to construct the inverse map ψ(x). The first step is to compute the powers of $\phi(y)^i$ mod h(y) for 0≤i<n, $\phi(y)^0 \bmod h(y)=1$ $\phi(y)^1 \bmod h(y)=-y^6+4y^5+2y^4-3y^3+y^2-4y+5$ $\phi(y)^2 \bmod h(y)=5y^6-2y^5-2y^4-2y^3+4y^2+2y+2$ $\phi(y)^3 \bmod h(y)=5y^6-2y^5-5y^4+2y^3-4y^2-y+2$ $\phi(y)^4 \mod h(y) = 3y^6 - 4y^5 + 3y^3 - 3y^2 - y - 3$ $\phi(y)^5 \mod h(y) = 4y^6 + 4y^5 - 5y^4 - 3y^3 + y^2 - 5y - 2$ $\phi(y)^6 \mod h(y) = y^6 - 2y^5 - 4y^4 - 2y^3 - 2y^2 - 4y - 1$ and put the coefficients into a matrix $$A = \begin{pmatrix} 1 & 0 & 0 & 0 & 0 & 0 & 0 \\ 5 & -4 & 1 & -3 & 2 & 4 & -1 \\ 2 & 2 & 4 & -2 & -2 & -2 & 5 \\ 2 & -1 & -4 & 2 & -5 & 2 & 5 \\ -3 & -1 & -3 & 3 & 0 & -4 & 3 \\ -2 & -5 & 1 & -3 & -5 & 4 & 4 \\ -1 & -4 & -2 & -2 & -4 & -2 & 1 \end{pmatrix}.$$

(Note that all of these computations are being done in $\mathbb{F}_q$.)
Next we compute the inverse matrix $$A^{-1} \mod q = \begin{pmatrix} 1 & 0 & 0 & 0 & 0 & 0 & 0 \\ -3 & 4 & 3 & 0 & -2 & 5 & -3 \\ 5 & 4 & 4 & 4 & -3 & 0 & -5 \\ 4 & 4 & 0 & 4 & 3 & -2 & 5 \\ -5 & -2 & 5 & -2 & 3 & -4 & 1 \\ -1 & -1 & -3 & -1 & 1 & 0 & 5 \\ -4 & 0 & 1 & -5 & -5 & 0 & 3 \end{pmatrix}$$

and use it to compute the coefficients $(c_0, \ldots, c_{n-1}) = (0, 1, 0, \ldots, 0) A^{-1} \mod q$ $= (-3, 5, -2, 0, 3, 4, -3)$ for the inverse polynomial $\psi(x) = -3x^6 + 5x^5 - 2x^4 + 3x^2 + 4x - 3.$ A quick check shows that $\psi(\phi(y)) \mod h(y) = y,$ $\phi(\phi(x)) \mod f(x) = x.$ We are now ready to encrypt a message. We take plaintext m and random polynomial r to be $m(x) = -x^6 + x^5 + x^4 - x,$ $r(x) = x^5 + x^4 - x^2 - x.$ Then the ciphertext is $c(y) = pr(\phi(y)) + m(\phi(y)) \mod h(y)$ $= 5y^6 + 3y^5 + 4y^4 - 2y^3 + y - 1.$ To decrypt we compute $a(x) = c(\psi(x)) \mod f(x)$ $= -x^6 + 4x^5 + 4x^4 - 3x^2 - 4x$ in $\mathbb{F}_q[x],$ $\equiv -x^6 + x^5 + x^4 - x \pmod{3} = m(x). \checkmark$ A Numerical Example: Homomorphic Properties In this section we do an example with larger parameters and illustrate homomorphic decryption of a product of two ciphertexts. We note that the parameters are far too small to be combinatorially secure. We take $q = 541, n = 7, p = 3.$ We find polynomials f, h, $\phi$, $\psi$ as in Section 5, omitting the details of the computation:

$f(x) = x^7 - x^5 + x^3 + x - 1$ $h(y) = y^7 - 177y^6 - 137y^5 + 172y^4 + 84y^3 - 148y^2 - 160y + 15$ $\phi(y) = -155y^6 + 26y^5 + 123y^4 - 118y^3 + 41y^2 + 84y - 162$ $\psi(x) = -8x^6 - 91x^5 + 258x^4 + 137x^3 + 266x^2 - 201x - 143$ We next encrypt two plaintexts, keeping in mind that all computations are being done modulo 541:

$m_1(x) = x^5 - x^3 - x^2 + x$ $r_1(x) = -x^3 + x^2 + x - 1$ $c_1(y) = pr_1(\phi(y)) + m_1(\phi(y)) \mod h(y)$
$= 144y^6 + 121y^5 - 94y^4 + 81y^3 + 203y^2 - 198y + 177$ $m_2(x) = x^6 + x^5 - x^4 - 1$ $r_2(x) = -x^6 + x^4 + x^2 - x$ $c_2(y) = pr_2(\phi(y)) + m_2(\phi(y)) \mod h(y)$
$= -73y^6 + 85y^5 + 241y^4 - 34y^3 - 152y^2 + 168y + 263$ We note for future reference that the product of the plaintexts is $m_3(x) = m_1(x) \cdot m_2(x) \mod (f(x), p)$
$= x^4 + x^3 + x^2 - x - 1.$ We next multiply the ciphtertexts, $c_3(y) = c_1(y) \cdot c_2(y) \mod (h(y), q)$
$= -21y^6 + 64y^5 - 65y^4 - 136y^3 + 223y^2 + 211y + 28.$ When we decrypt the product of the ciphertexts, we obtain the product of the plaintexts:

$a(x) = c_3(\psi(x)) \mod (f(x), q)$
$= 3x^6 - 15x^5 + 16x^4 + 4x^3 - 8x^2 - x + 2$
$= x^4 + x^3 + x^2 - x - 1 \mod (f(x), p)$
$= m_3(x) \mod (f(x), p) \checkmark$ We note that the reason that homomorphic decryption works is because the product $$(pr_1(x) + m_1(x)) \cdot (pr_2(x)m_2(x)) = -2x^{11} + x^{10} + 10x^9 - 8x^8 -$$
$$11x^7 + 11x^6 - 8x^5 + 12x^4 +$$
$$10x^3 - 23x^2 + 5x + 3$$
$$\equiv 3x^6 - 15x^5 + 16x^4 + 4x^3 -$$
$$8x^2 - x + 2 (\bmod\ f(x))$$

has coefficients that are smaller than $\lfloor q/2 \rfloor = 270$.

To further illustrate this last remark, we do an example in which homomorphic decryption fails because p is too large compared to q. We take $q=541, n=7, p=13.$ We use the polynomials $f(x) = x^7 + x^6 - x^4 + x - 1$ $h(y) = y^7 + 101y^6 - 81y^5 - 69y^4 - 127y^3 - 168y^2 - 224y - 223$ $\phi(y) = -89y^6 - 168y^5 + 245y^4 + 186y^3 + 130y^2 - 35y + 86$ $\psi(x) = -3x^6 + 261x^5 - 150x^4 + 87x^3 + 62x^2 + 16x + 201$ We choose plaintexts and compute ciphertexts as usual, $$m_1(x) = -x^5 - x^4 + x^3 + x$$
$$r_1(x) = x^6 - x^5 + x^4 - x^2$$
$$c_1(y) = pr_1(\phi(y)) + m_1(\phi(y)) \bmod h(y)$$
$$= 148y^6 + 214y^5 + 266y^4 - 172y^3 + 70y^2 - 132y + 119$$
$$m_2(x) = -x^4 + x^3 - x^2 + x$$
$$r_2(x) = x^4 + x^3 - x^2 - x$$
$$c_2(y) = pr_2(\phi(y)) + m_2(\phi(y)) \bmod h(y)$$
$$= -157y^6 + 250y^5 + 190y^4 - y^3 - 86y^2 + 98y + 66$$

The product of the plaintexts is $$m_3(x) = m_1(x) \cdot m_2(x) \bmod (f(x), p)$$
$$= 2x^6 - 4x^5 + 2x^4 - 2x^3 + 3x^2 - x,$$

but we observe that the product $$(pr_1(x) + m_1(x)) \cdot (pr_2(x)m_2(x)) = 156x^{10} + 14x^9 - 234x^8 +$$
$$220x^7 - 142x^6 - 328x^5 +$$
$$184x^4 + 142x^3 - 12x^2$$
$$\equiv -752x^6 - 420x^5 + 496x^4 +$$
$$440x^3 - 62x^2 - 560x +$$
$$468 (\bmod\ f(x))$$

has coefficients whose magnitude is larger than $\lfloor q/2 \rfloor = 270$. This means that decryption of $c_3$ will probably not be equal to $m_1 \cdot m_2$. And indeed we find that $$c_3(y) = c_1(y) \cdot c_2(y) \bmod h(y)$$
$$= 38y^6 - 179y^5 + 137y^4 - 191y^3 - 164y^2 - 129y - 219,$$

$$a(x) = c_3(\psi(x)) \bmod f(x)$$
$$= -211x^6 + 121x^5 - 45x^4 - 101x^3 - 62x^2 - 19x - 73$$
$$\equiv -3x^6 + 4x^5 - 6x^4 + 3x^3 + 3x^2 - 6x - 5 (\bmod 13)$$
$$\neq m_3(x).$$

7. A High-Dimensional Lattice Attack

To ease notation, in this section we write $m' = pr + m$ to denote "plaintext plus randomness." Thus, m' has small coefficients, since p is small and r and m have small coefficients. Given k ciphertexts $c_1, c_2, \ldots, c_k$ with k>n, we describe a lattice attack on the associated plaintexts $m'_1, \ldots, m'_k$ in a lattice L satisfying:

$\dim L = kn,$

Gaussian expected $\lambda_1(L) \approx \sqrt{kn/\pi e} \cdot q^{1-\frac{n}{k}},$ Target size $\approx \sqrt{n^2 + kn} \cdot p/3.$ If we ignore the multiplicative structure, than the map $$\frac{\mathbb{F}_q[x]}{(f(x))} \to \frac{\mathbb{F}_q[y]}{(h(y))}$$

$m(x) \bmod f(x) \mapsto m(\phi(y)) \bmod h(y)$ defined in (3.2) may be viewed as a linear transformation from $\mathbb{F}_{q^n}$ to $\mathbb{F}_{q^n}$. More precisely, taking $1, x, \ldots, x^{n-1}$ and $1, y, \ldots, y^{n-1}$ as bases, for each $0 \leq i < n$ we write $$x^i \mapsto \phi(y)^i \bmod h(y) = \sum_{j=0}^{n-1} a_{ij} y^j.$$

We let $A=(a_{ij})$ be the associated matrix. Then, identifying polynomials $v(x) = v_0 + v_1 x + \ldots + v_{n-1} x^{n-1}$ with vectors $v=(v_0, v_1, \ldots, v_{n-1})$, the formula $c(y) = m'(\phi(y)) \bmod h(y)$ becomes $c \equiv m'A (\bmod\ q).$ In this formula, the attacker knows c, and she knows that m' is short, but she does not know A. So there are $n^2+n$ unknowns, namely the coordinates of A and m', of which n coordinates are small. So this single equation does not reveal much information about m' or A. However, suppose that the attacker has access to a large number of ciphertexts $c_1, c_2, \ldots, c_k.$ Writing $m'_i = (m'_{i0}, m'_{i1}, \ldots, m'_{i,n-1})$ and similarly for $c_i$, we form the matrices $$M' = (m'_{ij})_{\substack{1 \le i \le k \\ 0 \le j < n}} \text{ and } C = (c_{ij})_{\substack{1 \le i \le k \\ 0 \le j < n}}.$$

This gives the formula $$C \equiv M'A \pmod{q}. \quad (7.1)$$

The unknown matrix M' has small entries, so it is a short vector in the space $\mathbb{Z}^{k \times n}$ of k-by-n matrices having integer coefficients. So we can set up a lattice problem to find M'. Let U be the k-by-n matrix defined by $$C = M'A + qU.$$

Then we have a matrix equation $$(C \quad qI) \begin{pmatrix} A^{-1} \\ -UA^{-1} \end{pmatrix} = M'$$

We observe that the dimensions of these matrices are $$(C \quad qI) \in \mathbb{Z}^{k \times (n+k)}, \begin{pmatrix} A^{-1} \\ -UA^{-1} \end{pmatrix} \in \mathbb{Z}^{(n+k) \times n}, M' \in \mathbb{Z}^{k \times n}.$$

The small target matrix M' thus lives in the known sublattice of $\mathbb{Z}^{k \times n}$ defined by $$L(C, q) := \{(C \quad qI)W : W \in \mathbb{Z}^{(n+k) \times n}\}$$

$$= \text{Image}\left(\mathbb{Z}^{(n+k) \times n} \xrightarrow{W \mapsto (C \quad qI)W} \mathbb{Z}^{k \times n}\right).$$

We have $$\dim L(C, q) = kn.$$

We use the notation $E_{ij}$ for a matrix (of the appropriate dimensions) with a 1 in the ij-entry and 0 elsewhere. In order to compute (estimate) the discriminant, we take the images of each of the $n^2+kn$ basis matrices in $E_{ij} \in \mathbb{Z}^{(n+k) \times n}$ and write it as a linear combination of the kn basis matrices $E_{ij} \in \mathbb{Z}^{k \times n}$. Thus $$E_{ij} \mapsto (C \quad qI)E_{ij} = (0 \; 0 \; \ldots \; 0^* 0 \; \ldots \; 0),$$

where * denotes the i'th column of $(C \quad qI)$, which now occupies the j'th column in the image space. In other words, if we write the columns of $C$ as $(c'_0 \; c'_1 \; \ldots \; c'_{n-1})$ and let $e_1, \ldots, e_k$ be the standard basis vectors in $\mathbb{Z}k$, then $$(C \quad qI)E_{ij} = \begin{pmatrix} & & j & & \\ & & \downarrow & & \\ 0 & \ldots & 0 & v & 0 & \ldots & 0 \end{pmatrix} \text{ with }$$

$$v = \begin{cases} c'_i & \text{if } 1 \le i \le n, \\ qe_{i-n} & \text{if } n < i \le n+k \end{cases}.$$

In particular, we have $$(C \quad qI)E_{ij} = qE_{i-n,j} \text{ for all } 0 \le j < n \text{ and all } n < i \le n+k.$$

So among the $n^2+kn$ matrices that we know span $L(C, q)$, there are nk of them that are q times a basis matrix.

We now view matrices in $\mathbb{Z}^{k \times n}$ as simply being vectors of dimension kn. Then $L(C, q)$ is the row span of a $(n^2+kn)$-by-kn matrix, so its discriminant is the gcd of the kn-by-kn minors of that matrix. But from our computation, the bottom kn-by-kn block of this matrix is q times the identity matrix. In other words, the discriminant of $L(C, q)$ is the gcd of the kn-by-kn minors of a $(n^2+kn)$-by-kn matrix of the form $$\begin{pmatrix} * \\ qI_{kn} \end{pmatrix},$$

where the top block is $n^2$-by-kn and the bottom block is kn-by-kn. Now any kn-by-kn block must include at least $kn-n^2$ rows from the bottom block, hence its determinant will be divisible by $q^{kn-n^2}$. (This assumes that $k \ge n$.) We have proven that $$q^{kn-n^2} | \text{Disc } L(C, q).$$

(In practice, they are likely to be equal, or differ by a very small factor.) The Gaussian expected norm of the smallest vector in a lattice L is $$\gamma = \gamma(L) = \sqrt{\dim L/\pi e}(\text{Disc } L)^{1/\dim L},$$

so for $L(C, q)$ we have $$\gamma = \gamma(C, q) \approx \sqrt{kn/\pi e} q^{1-n/k}.$$

On the other hand, the coordinates of the plaintexts are random numbers modulo p, and the matrix M' has $n^2+kn$ entries, so its Euclidean norm is roughly $$\|M'\| \approx \sqrt{n^2 + kn} \cdot \frac{p}{3}.$$

Hence the Hermite ratio is $$\frac{\gamma}{\|M'\|} \approx \sqrt{\frac{1}{1+n/k}} \frac{q^{1-n/k}}{p}.$$

So taking (say) k=2n, the Hermite ratio is roughly $p^{-1}\sqrt{q}$. On the other hand, this is in a lattice of dimension $2n^2$, so if $n \ge 100$, then it is unlikely that it will be feasible to run a lattice reduction algorithm.

Remark 4. One might make the more conservative assumption that the attacker knows a large number of plaintext/ciphertext pairs $$\{(m_1, c_1), \ldots, (m_k, c_k)\},$$

but of course we must assume that she does not know the random quantities $r_i$ that were used for encryption; cf. Remark 2. Letting $R = (r_{ij})$ and $M = (m_{ij})$, we have $$M' = pR + M,$$

so the matrix equation (7.1) becomes $$C = pRA + MA \pmod{q}.$$

In this formula, the attacker knows $C$ and M, and she knows that R is small. So she can set up a closest vector problem to find R. The net effect is $\|R\| \approx \|M'\|/p$, so the target vector becomes smaller, leading to a Hermite ratio of roughly $\sqrt{q}$, rather than $p^{-1}\sqrt{q}$.

Remark 5. We note that the lattice attack described in this section ignores two additional pieces of structure. First, the map is a field isomorphism between two copies of $\mathbb{F}_{q^n}$, not merely a vector space isomorphism between two copies of $\mathbb{F}_{q^n}$. Second, the polynomial used to define one of the copies of $\mathbb{F}_{q^n}$ has small coefficients. It is possible to exploit these properties to formulate an attack that requires finding small solutions to systems of higher degree multivariable polynomial equations, but we do not see how to use these properties while keeping the attack linear, i.e., a lattice problem.

8. Size of the Remainder

In this section we investigate the size of the coefficients of the remainder when one polyomial is divided by another. Fix integers m≥n>0. Fix a polynomial $$f(x) = \prod_{i=1}^{n} (x - \theta_i) \in \mathbb{C}[x].$$

Let $$b(x) = \sum_{i=0}^{m-1} b_i x^i$$

be chosen with each $b_i$ satisfying some probability distribution. Different coefficients may have different distributions, but we assume that they are independent and have mean 0, which implies that[4]

[4] In practice, our b(x) will be a product of plaintexts, so it will be a product of t polynomials whose coefficients are independent and more-or-less uniform in some interval. This means that the coefficients of b(x) each satisfy some sort of t-fold hypergeometric distribution, but note that the middle coefficients will be much larger than the ones near the top and the bottom. That is why we allow the coefficients of our b to have different distributions.

$E(b_i b_j) = E(b_i)E(b_j) = 0$ if $i \neq j$, while the numbers $E(b_i^2)$ depend on the distributions satisfied by the various $b_i$.

We perform division with remainder, $b(x) = f(x)q(x) + r(x)$ with 0≤deg $r$<n.

As usual, we view the polynomials as vectors, $b = (b_0, \ldots, b_m)$ and $r = (b_0, \ldots, b_n)$.

We let V denote the vanderMonde matrix of the $\theta_i$'s, $$V = (\theta_i^j)_{\substack{1 \leq i \leq n \\ 0 \leq j < n}} = \begin{pmatrix} 1 & \theta_1 & \cdots & \theta_1^{n-1} \\ 1 & \theta_2 & \cdots & \theta_2^{n-1} \\ \vdots & & \ddots & \vdots \\ 1 & \theta_n & \cdots & \theta_n^{n-1} \end{pmatrix},$$

and we set $$\theta^{(j)} = \begin{pmatrix} \theta_1^j \\ \theta_2^j \\ \vdots \\ \theta_n^j \end{pmatrix}.$$

Then we set $$b(\theta) = \begin{pmatrix} b(\theta_1) \\ b(\theta_2) \\ \vdots \\ b(\theta_n) \end{pmatrix} = \sum_{j=0}^{m-1} b_j \theta^{(j)},$$

and similarly for $r(\theta)$.

We take the relation $b(x) = f(x)q(x) + r(x)$ and substitute $x = \theta_1, \ldots, \theta_n$. Since $f(\theta_i) = 0$, this gives $r(\theta_i) = b(\theta_i)$ for all 1≤i≤n.

With our earlier notation, this is simply the equality of vectors $r(\theta) = b(\theta)$.

Now we observe that since r has degree at most n−1, we can write $r(\theta)$ as $$r(\theta) = \sum_{j=0}^{n-1} r_j \theta^{(j)} = Vr.$$

Hence $r = V^{-1}b(\theta)$.

We now compute the expected value of $\|r\|^2$ as $b(x)$ varies.

$$\begin{aligned} E(\|r\|^2) &= E(\|V^{-1}b(\theta)\|^2) \\ &= E(^t b(\theta)^t V^{-1} V^{-1} b(\theta)) \\ &= E\left(\sum_{j,k=0}^{m-1} b_k^t \theta^{(k)t} V^{-1} V^{-1} b_j \theta^{(j)}\right) \\ &= \sum_{j,k=0}^{m-1} E(b_k b_j)^t \theta^{(k)t} V^{-1} V^{-1} \theta^{(j)} \\ &= \sum_{j=0}^{m-1} E(b_j^2)^t \theta^{(j)t} V^{-1} V^{-1} \theta^{(j)} \\ &= \sum_{j=0}^{m-1} E(b_j^2) \|V^{-1} \theta^{(j)}\|^2. \end{aligned} \qquad (8.1)$$

This last formula explains what's going on. If we assume that f(x) is fixed and that deg b(x) is large compared to n=deg f(x), then we obtain the rough, but useful, estimate $$E(\|r\|^2) \stackrel{\sim}{<} \max_{0 \leq j < m} \left(E(b_j^2) \cdot \max_{1 \leq i \leq n} |\theta_i|^j\right).$$

Which term dominates will depend on the relative size of $E(b_j^2)$ and max $|\theta_i|^j$ for 0≤j<m.

In our scenario, we have $b(x) = a_1(x) \ldots a_t(x)$ with deg $a_i \approx n$, so m≈nt. The coefficients of the $a_i$ are uniform and small, so most of the coefficients of b are roughly $C^t$. Then $E(\|r\|^2)$ is roughly $C^t$ max $|\theta_i|^{nt}$. So in order for decryption to work, we need roughly $q > (C \max|\theta_i|^n)$.

As expected, we get exponential growth in t. But this shows very clearly how the largest root of f(x) has a major influence on the required size of q.

Definition.

Let $f(x) \in \mathbb{C}[x]$ be a monic polynomial and let $\theta_1, \ldots, \theta_n$ be the roots of f. We let $$M(f) = \max_{1 \le i \le n} |\theta_i|.$$

This quantity is often called the Mahler measure of f, since it is also equal to $$M(f) = \int_0^1 \log|f(e^{2\pi i t})| dt.$$

Example 6

Experiments clearly reveal the effect of the size of the roots of f(x). We fixed an f(x) of degree 11, chose 100 polynomials g(x) of degree 32 with random coefficients in [−2, 2] and computed the largest coefficients of g(x) modulo f(x). We used the polynomials $$f_1(x) = x^{11} - x^{10} + x^9 + x^6 - x^5 + x^2 - x - 1$$

$$f_2(x) = x^{11} + x^{10} + x^5 - x^4 + x^3 - x^2 - x - 1$$

$$f_3(x) = x^{11} - x^{10} + x^7 + x^6 + x^5 - x^3 - x^2 - 1.$$

Then

| f | M(f) | Avg $|g \bmod f|_\infty$ | St.Dev. $|g \bmod f|_\infty$ |
|---|---|---|---|
| $f_1$ | 1.1835 | 43.420 | 16.226 |
| $f_2$ | 1.3511 | 352.250 | 191.452 |
| $f_3$ | 1.4307 | 1167.720 | 666.196 |

Example 7

We now consider if there is an advantage in taking the non-zero coefficients of f(x) to be in the lower degree terms. So we take f(x) to have the form $$f(x) = x^n + \tilde{f}(x),$$

where $\tilde{f}(x)$ is random trinary of small degree. Simple estimates make it clear that such polynomials tend to have smaller roots than polynomials whose non-zero monomials have higher degree. In order to compare with the experiments in Example 6, we took polynomials f(x) of degree 11 with non-zero coefficients on monomials of degree at most 4, more precisely, we took $$f(x) = x^{11} + a_4 x^4 + a_3 x^3 + a_2 x^2 + a_1 x - 1$$

with the $a_i$ randomly chosen from $\{\pm 1\}$. The polynomial $$f_4(x) = x^{11} - x^4 + x^3 - x^2 + x - 1$$

has $$M(f_4) = 1.18225,$$

so $M(f_4)$ is comparable to $M(f_1)$ for the $f_1(x)$ in Example 6. For $f_4$ and 100 samples, we found Avg $|g \bmod f_4|_\infty = 28.450$ and St.Dev. $|g \bmod f_4|_\infty = 15.658$.

These may be compared with the roughly similar values 43.4 and 16.2 for $f_1$. A likely reason for the difference is due to secondary effects due to the other roots. Thus the magnitudes of the roots of $f_1$ are 1.18, 1.18, 1.15, 1.15, 1.08, 1.08, 1.00, 1.00, 0.890, 0.890, 0.578, while the magnitudes of the roots of $f_4$ are 1.18, 1.18, 1.00, 1.00, 1.00, 1.00, 1.00, 0.953, 0.953, 0.888, 0.888.

So the second largest root of $f_1$ is significantly larger than the second largest root of $f_4$.

As the formula (8.1) makes clear, the size of the inverse of the vanderMonde matrix $V_f$ also has an effect. We list the sup norm and the spectral radius of $V_f^{-1}$ for our two example polynomials.

|  | $f_1$ | $f_4$ |
|---|---|---|
| Spectral Radius of $V_f^{-1}$ | 7.766 | 5.522 |
| Sup Norm of $V_f^{-1}$ | 0.666 | 0.263 |

We note that the remainder coefficients for division by $f_1$ and $f_4$ resemble one another much more closely than do the remainder coefficients for division by $f_2$ or $f_3$. This suggests that it is not so much the distribution of non-zero monomials that affects the remainder co-efficients as it is the size of the roots of f. However, if one desires to find an f with comparatively small roots, it is definitely advantageous to select f with non-zero monomials in the lower degree terms.

Using a Polynomial for p

A product of t plaintexts has the form $$\prod_{i=1}^{t} (pr_i(x) + m_i(x)) \bmod f(x).$$

In order for decryption to be successful, the coefficients of this reduced product must be in the range $-\frac{1}{2}q$ to $\frac{1}{2}q$. In this section we look at the product before reduction modulo f(x) and consider ways in which to reduce the size of its coefficients. For simplicity, we will take $r_i$ and $m_i$ to be random trinary polynomials. And as a further simplification, we will ignore the $m_i$ and just look at products of the form $$A(x) = \prod_{i=1}^{t} p(x) r_i(x),$$

but note that we now allow p be be a polynomial. We performed experiments with:

$p(x)=$one of $3, x-2, x^2-x-1, x^3-x-1, \ldots,$ $r_i(x)=$random trinary of degree $n$−deg $p$.

We computed the largest magnitude coefficient of the product A(x) for a 1000 samples, and then computed the mean and standard deviation of these maxima. The results are listed in the Table 2.

TABLE 2

| Largest coefficient of $A(x) = \Pi p(x) r_i(x)$ | | | | |
|---|---|---|---|---|
| p(x) | n | t | Mean $\|A\|_\infty$ | S.D. $\|A\|_\infty$ |
| 3 | 21 | 5 | 53992.2 | 23225.6 |
| x − 2 | 21 | 5 | 21037.7 | 12800.8 |

TABLE 2-continued

| Largest coefficient of A(x) = Πp(x)r$_i$(x) | | | | |
|---|---|---|---|---|
| p(x) | n | t | Mean $\|A\|_\infty$ | S.D. $\|A\|_\infty$ |
| $x^2 - x - 1$ | 21 | 5 | 4622.0 | 2931.7 |
| $x^3 - x - 1$ | 21 | 5 | 7369.4 | 5682.6 |
| $x^4 - x^2 - 1$ | 21 | 5 | 3569.1 | 2178.1 |
| $x^6 - x^3 - 3$ | 21 | 5 | 2535.9 | 1697.1 |

However, we note that there are some tradeoffs. First, if p(x) is non-constant, then the degree of r(x) is smaller, which means there is less combinatorial security in the choice of r. So using $p(x)=x^2-x-1$ is probably not significant, but using $p(x)=x^6-x^3-1$, or more generally $x^{2k}-x^k-1$ with larger k, may lead to a larger n that cancels the advantage of products having smaller coefficients.

Second, decryption ultimately reveals the value of m(x) in the ring $\mathbb{Z}[x]/(p(x), f(x))$. So for example, if p(x)=x-2, then one obtains the value of m(2)mod f(2), and thus all computations are being done in the ring $\mathbb{Z}/f(2)\mathbb{Z}$. In this case, it might be advisable to choose f so that f(2) is prime. Similarly, if $p(x)=x^2-x-1$, then computations are done in the ring $\mathbb{Z}/D\mathbb{Z}$ with $$D=f(\tfrac{1}{2}(1+\sqrt{5}))f(\tfrac{1}{2}(1-\sqrt{5})).$$

What is claimed is:

1. A system for homomorphic encryption via finite ring isomorphisms, comprising:
    at least one processor; and
    memory, operatively connected to the at least one processor and storing instructions that, when executed by the at least one processor, cause the at least one processor to:
    select a polynomial f(x) of exact degree n with small coefficients in a ring $F_q[x]$;
    select a polynomial h(y) of exact degree n in a ring $F_q[y]$;
    construct an isomorphism from the ring $F_q[x]/(f(x))$ to the ring $F_q[y]/(h(y))$;
    construct an inverse isomorphism from the ring $F_q[y]/(h(y))$ to the ring $F_q[x]/(f(x))$;
    encrypt one or more messages using said isomorphism from the ring $F_q[x]/(f(x))$ to the ring $F_q[y]/(h(y))$;
    transmit the encrypted one or more messages to a remote computer;
    receive one or more encrypted response messages from the remote computer based at least in part on the transmitted one or more messages; and
    decrypt the one or more encrypted response messages.

2. The system of claim 1, wherein to construct an isomorphism from the ring $F_q[x]/(f(x))$ to the ring $F_q[y]/(h(y))$ the memory further stores instructions that, when executed by the at least one processor, cause the at least one processor to determine a root $\phi(y)$ of the polynomial f(x) in the ring $F_q[y]/(h(y))$, and wherein to construct an inverse isomorphism from the ring $F_q[y]/(h(y))$ to the ring $F_q[x]/(f(x))$ the memory further stores instructions that, when executed by the at least one processor, cause the at least one processor to determine to determine a root $\psi(x)$ of the polynomial h(y) in a ring $F_q[x]/(f(x))$.

3. The system of claim 2, wherein the polynomials f(x) and h(y) are irreducible over $F_q$.

4. The system of claim 1, wherein to decrypt the one or more encrypted response messages, the memory further stores instructions that, when executed by the at least one processor, cause the at least one processor to:
    construct a polynomial u(x) in the ring $F_q[x]$ based in part on the one or more encrypted response messages in the ring $F_q[y]/(h(y))$ and in part on the inverse isomorphism from the ring $F_q[y]/(h(y))$ to the ring $F_q[x]/(f(x))$; and
    construct a decrypted response message based in part on the polynomial u(x).

5. The system of claim 1, wherein to encrypt the one or more messages, the memory further stores instructions that, when executed by the at least one processor, cause the at least one processor to:
    construct a polynomial u(x) in the ring $F_q[x]$ based in part on the one or more messages; and
    construct the encrypted message c(y) in the ring $F_q[y]/(h(y))$ based in part on the polynomial u(x) and the isomorphism from the ring $F_q[x]/(f(x))$ to the ring $F_q[y]/(h(y))$.

6. The system of claim 5, wherein the polynomial u(x) has small coefficients.

7. The system of claim 5, wherein the polynomial u(x) is constructed in part from polynomials p(x), r(x), and m(x) in the ring $F_q[x]/(f(x))$, wherein p(x), r(x), and m(x) have small coefficients.

8. The system of claim 7, wherein the polynomial u(x) is equal to p(x)*r(x)+m(x) in the ring $F_q[x]/(f(x))$.

9. The system of claim 8, wherein the decrypted message is constructed in part from an image of the polynomial u(x) in a ring $F_q[x]/(f(x),p(x))$.

10. The system of claim 1, wherein the one or more encrypted response messages are constructed in part by the remote computer applying algebraic operations in the ring $F_q[y]/(h(y))$ to the transmitted encrypted one or more messages.

11. A method for homomorphic encryption via finite ring isomorphisms, the method comprising:
    selecting a polynomial f(x) of exact degree n with small coefficients in a ring $F_q[x]$;
    selecting a polynomial h(y) of exact degree n in a ring $F_q[y]$;
    constructing an isomorphism from the ring $F_q[x]/(f(x))$ to the ring $F_q[y]/(h(y))$;
    constructing an inverse isomorphism from the ring $F_q[y]/(h(y))$ to the ring $F_q[x]/(f(x))$;
    encrypting one or more messages using said isomorphism from the ring $F_q[x]/(f(x))$ to the ring $F_q[y]/(h(y))$;
    transmitting the encrypted one or more messages to a remote computer;
    receiving one or more encrypted response messages from the remote computer based at least in part on the transmitted one or more messages; and
    decrypting the one or more encrypted response messages.

12. The method of claim 11, wherein constructing an isomorphism from the ring $F_q[x]/(f(x))$ to the ring $F_q[y]/(h(y))$ comprises determining a root $\phi(y)$ of the polynomial f(x) in the ring $F_q[y]/(h(y))$, and wherein constructing an inverse isomorphism from the ring $F_q[y]/(h(y))$ to the ring $F_q[x]/(f(x))$ comprises determining a root $\psi(x)$ of the polynomial h(y) in a ring $F_q[x]/(f(x))$.

13. The method of claim 12, wherein the polynomials f(x) and h(y) are irreducible over $F_q$.

14. The method of claim 11, wherein decrypting the one or more encrypted response messages comprises:
constructing a polynomial $u(x)$ in the ring $F_q[x]$ based in part on the one or more encrypted response messages in the ring $F_q[y]/(h(y))$ and in part on the inverse isomorphism from the ring $F_q[y]/(h(y))$ to the ring $F_q[x]/(f(x))$; and
constructing a decrypted response message based in part on the polynomial $u(x)$.

15. The method of claim 11, wherein encrypting the one or more messages comprises:
constructing a polynomial $u(x)$ in the ring $F_q[x]$ based in part on the one or more messages; and
constructing the encrypted message $c(y)$ in the ring $F_q[y]/(h(y))$ based in part on the polynomial $u(x)$ and the isomorphism from the ring $F_q[x]/(f(x))$ to the ring $F_q[y]/(h(y))$.

16. A computer-readable storage device having computer executable instructions stored thereon, which, when executed by a computing system, provide instructions to perform a method for homomorphic encryption via finite ring isomorphisms, the method comprising:
selecting a polynomial $f(x)$ of exact degree n with small coefficients in a ring $F_q[x]$;
selecting a polynomial $h(y)$ of exact degree n in a ring $F_q[y]$;
constructing an isomorphism from the ring $F_q[x]/(f(x))$ to the ring $F_q[y]/(h(y))$;
constructing an inverse isomorphism from the ring $F_q[y]/(h(y))$ to the ring $F_q[x]/(f(x))$;
encrypting one or more messages using said isomorphism from the ring $F_q[x]/(f(x))$ to the ring $F_q[y]/(h(y))$;
transmitting the encrypted one or more messages to a remote computer;
receiving one or more encrypted response messages from the remote computer based at least in part on the transmitted one or more messages; and
decrypting the one or more encrypted response messages.

17. The computer-readable storage device of claim 16, wherein constructing an isomorphism from the ring $F_q[x]/(f(x))$ to the ring $F_q[y]/(h(y))$ comprises determining a root $\phi(y)$ of the polynomial $f(x)$ in the ring $F_q[y]/(h(y))$, and wherein constructing an inverse isomorphism from the ring $F_q[y]/(h(y))$ to the ring $F_q[x]/(f(x))$ comprises determining a root $\psi(x)$ of the polynomial $h(y)$ in a ring $F_q[x]/(f(x))$.

18. The computer-readable storage device of claim 17, wherein the polynomials $f(x)$ and $h(y)$ are irreducible over $F_q$.

19. The computer-readable storage device of claim 16, wherein decrypting the one or more encrypted response messages comprises:
constructing a polynomial $u(x)$ in the ring $F_q[x]$ based in part on the one or more encrypted response messages in the ring $F_q[y]/(h(y))$ and in part on the inverse isomorphism from the ring $F_q[y]/(h(y))$ to the ring $F_q[x]/(f(x))$; and
constructing a decrypted response message based in part on the polynomial $u(x)$.

20. The computer-readable storage device of claim 16, wherein encrypting the one or more messages comprises:
constructing a polynomial $u(x)$ in the ring $F_q[x]$ based in part on the one or more messages; and
constructing the encrypted message $c(y)$ in the ring $F_q[y]/(h(y))$ based in part on the polynomial $u(x)$ and the isomorphism from the ring $F_q[x]/(f(x))$ to the ring $F_q[y]/(h(y))$.

* * * * *